(12) United States Patent
Yu et al.

(10) Patent No.: US 10,560,141 B2
(45) Date of Patent: Feb. 11, 2020

(54) MOBILE TERMINAL, BASE STATION AND NON-TRANSITORY COMPUTER-READABLE MEDIUM TO SECURELY RECEIVE SIGNAL

(71) Applicant: JRD Communication (Shenzhen) LTD., Shenzhen (CN)

(72) Inventors: Bin Yu, Shenzhen (CN); Weiqin Yang, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/341,948

(22) PCT Filed: Sep. 5, 2017

(86) PCT No.: PCT/CN2017/100489
§ 371 (c)(1),
(2) Date: Apr. 15, 2019

(87) PCT Pub. No.: WO2018/068594
PCT Pub. Date: Apr. 19, 2018

(65) Prior Publication Data
US 2019/0245578 A1    Aug. 8, 2019

(30) Foreign Application Priority Data
Oct. 13, 2016 (CN) .......................... 2016 1 0893846

(51) Int. Cl.
*H03C 7/00* (2006.01)
*H04B 1/69* (2011.01)
(Continued)

(52) U.S. Cl.
CPC ............... *H04B 1/69* (2013.01); *H04L 7/043* (2013.01); *H04W 12/001* (2019.01);
(Continued)

(58) Field of Classification Search
CPC ..... H04L 27/04; H04L 1/0617; H04L 5/0048; H03C 1/10; H04W 72/0413
(Continued)

(56) References Cited

U.S. PATENT DOCUMENTS 7,313,164 B1    12/2007  Wilson et al.
2006/0274863 A1*  12/2006  Haentzschel ....... H04J 13/0022
                                                        375/343
(Continued)

FOREIGN PATENT DOCUMENTS

CN       104539310       4/2015
CN       105680902       6/2016
(Continued)

OTHER PUBLICATIONS

International Search Report and the Written Opinion dated Nov. 30, 2017 From the International Searching Authority Re. Application No. PCT/CN2017/100489 and Its Translation of Search Report Into English. (9 Pages).

*Primary Examiner* — Khai Tran

(57) ABSTRACT

Disclosed are a mobile terminal, a base station and a non-transitory computer-readable medium to securely receive a signal. When the mobile terminal sends information, randomly implementing an XNOR calculation is randomly implemented on corresponding digits of a low-frequency digital sequence which is to transmit the information and a first cyclic PN sequence or a second cyclic PN sequence so as to obtain spread sequences. The spread sequences are modulated and sent. The base station or the mobile terminal receives the spread sequence, and despreads the same using the first and second cyclic PN sequences. The present invention effectively prevents lawbreakers from decoding and monitoring a communication process.

15 Claims, 3 Drawing Sheets

(51) Int. Cl.
  *H04W 12/00* (2009.01)
  *H04W 12/02* (2009.01)
  *H04L 7/04* (2006.01)

(52) U.S. Cl.
  CPC ....... *H04W 12/0017* (2019.01); *H04W 12/02* (2013.01); *H04B 2201/698* (2013.01)

(58) Field of Classification Search
  USPC ................................ 375/315, 343; 370/338
  See application file for complete search history.

(56) References Cited

U.S. PATENT DOCUMENTS

| | | | | |
|---|---|---|---|---|
| 2012/0087307 | A1* | 4/2012 | Poegel | H04B 1/707 370/328 |
| 2012/0106529 | A1* | 5/2012 | Ferchland | H04W 52/0229 370/338 |
| 2014/0118052 | A1 | 5/2014 | Liu et al. | |

FOREIGN PATENT DOCUMENTS

| CN | 106341158 | 1/2017 |
|---|---|---|
| WO | WO 2018/068594 | 4/2018 |

* cited by examiner

| Low frequency digital signal | 1 | | | | | | 1 | | | | | | 0 | | | | | |
|---|---|---|---|---|---|---|---|---|---|---|---|---|---|---|---|---|---|---|
| PN sequence | 1 | 0 | 1 | 1 | 0 | 0 | 1 | 1 | 0 | 1 | 0 | 1 | 1 | 1 | 0 | 0 | 1 | 1 |
| Spread sequence | 1 | 0 | 1 | 1 | 0 | 0 | 1 | 1 | 0 | 1 | 0 | 1 | 0 | 0 | 1 | 1 | 0 | 0 |

FIG. 1

| Received spread sequence | 1 | 0 | 1 | 1 | 0 | 0 | 1 | 1 | 0 | 1 | 0 | 1 | 0 | 0 | 1 | 1 | 0 | 0 |
|---|---|---|---|---|---|---|---|---|---|---|---|---|---|---|---|---|---|---|
| PN sequence | 1 | 0 | 1 | 1 | 0 | 0 | 1 | 1 | 0 | 1 | 0 | 1 | 1 | 1 | 0 | 0 | 1 | 1 |
| Low frequency digital signal | 1 | | | | | | 1 | | | | | | 0 | | | | | |

FIG. 2

| Received spread sequence | 0 | 0 | 1 | 1 | 0 | 0 | 1 | 1 | 1 | 1 | 1 | 0 | 1 | 0 | 0 | 1 | 1 | 0 | 0 |
|---|---|---|---|---|---|---|---|---|---|---|---|---|---|---|---|---|---|---|---|
| PN sequence | 1 | 0 | 1 | 1 | 0 | 0 | 1 | 1 | 0 | 1 | 0 | 1 | 1 | 1 | 0 | 0 | 1 | 1 | |
| High frequency digital signal | 0 | 1 | 1 | 1 | 1 | 1 | 1 | 1 | 1 | 1 | 1 | 1 | 0 | 0 | 0 | 0 | 0 | 0 | |

FIG. 3

MOBILE TERMINAL, BASE STATION AND NON-TRANSITORY COMPUTER-READABLE MEDIUM TO SECURELY RECEIVE SIGNAL

RELATED APPLICATIONS

This application is a National Phase of PCT Patent Application No. PCT/CN2017/100489 having International filing date of Sep. 5, 2017, which claims the benefit of priority of Chinese Patent Application No. 201610893846.1 filed on Oct. 13, 2016. The contents of the above applications are all incorporated by reference as if fully set forth herein in their entirety.

FIELD AND BACKGROUND OF THE INVENTION

The present invention relates to a mobile terminal field, and more particularly to a mobile terminal, a base station and a non-transitory computer-readable medium to securely receive signal.

Since low frequency signals are not suitable for long-distance propagation in the air, there is a concept of modulation and demodulation in the mobile communication process. With an analog of the mobile communication to the traditional postal mail, the modulation is the process in which the sender (transmitting party) puts a message (information, a sequence of 0 and 1) in an envelope (carrier wave), and then sends it out (transmitted by the antenna), and the demodulation is a process in which the receiver (receiving party) receives and opens the envelope (removing the carrier wave) to obtain the content of the message (information sent by the transmitting party). In the above discussion, it is assumed that both sides of the communication are determined on a given carrier wave frequency within a given area, that is, the carrier wave frequency is exclusive to both communicating parties. However, the frequency resources are limited. Therefore, when the number of users in a given area is too large, it will not be able to provide more carrier wave frequencies for the newly added communication parties. To alleviate this problem, spread spectrum communication is generated.

Spread spectrum is similar to re-branding an address for the foregoing modulated signal, and all communication parties use the same carrier wave frequency, and the address used for each communication is different from others, so the communication is different from the above by frequency. Therefore, unlike the aforementioned in which the communication is distinguished by frequency, the spread spectrum communication distinguishes the communication by the address, thereby solving the problem of limited frequency resources.

The basic principle of spread spectrum communication is as follows: the base station and the mobile terminal have a series of digital sequence (hereinafter referred to as a PN sequence, i.e., a Pseudo Noise sequence) consisting of 0 and 1 outputted by high frequency cyclic high-speed (the output rate is much higher than the rate of information to be transmitted, such as the voice digital bit rate of 64 kbps, i.e. 64000 bits per second, and the PN sequence output rate of 400 kbps), and when the mobile terminal is in the voice service, the base station allocates a PN sequence start bit to the mobile terminal, and from then on, the data transmission process established by the mobile terminal and the base station is as follows:

It is illustrated that the mobile terminal transmits signals to the base station, the mobile terminal first spreads the voice digit sequence to be transmitted, that is, XORing the voice digit sequence with a PN sequence starting with a start bit allocated by the base station (re-branding an address), and then modulating the same into a carrier wave (enclosing the same into an envelope) and transmitting it by the antenna; when the base station receives the signal, it demodulates (opens the envelope) first, and then only a given PN sequence can be XORed with the demodulated signal, so that the XORed signal becomes a low frequency signal; with the number of the start bit of the given PN sequence in the entire PN sequence (the address re-branded by the transmitting party), it can be known which mobile terminal the signal is transmitted by; certainly, the base station serves multiple mobile terminals at the same time. Then, the PN sequences (different start codes) of respective mobile terminals are respectively XORed with the received signals until a given PN sequence is found to become a low frequency signal after being XORed.

Similarly, for the base station to transmit a signal to a specific mobile terminal, the signal to be transmitted is XORed with the given PN sequence before transmitting out. The mobile terminal receives the signal, and then XORs the PN sequence. If a low frequency signal can be obtained after XORing, it means the signal is transmitted therefor. Otherwise, the signal is not transmitted therefor and then is discarded.

"XOR" is a mathematical operator applied to logical operations. The algorithm is a XOR b=ab+a'b' (a' is not a, b' is not b). The result of true "XOR" false is false, and the result of false "XOR" true is also false. The result of true "XOR" true is true, and the result of false "XOR" false is true. Namely, the two values are the same, the XOR result is true, and on the contrary, is false. The XOR symbol is 0, and the XOR truth table is as follows:

| a | b | a b |
|---|---|-----|
| 0 | 0 | 1 |
| 1 | 1 | 1 |
| 0 | 1 | 0 |
| 1 | 0 | 0 |

A simple illustration will be given to illustrate the process of spreading and despreading in the prior art;

Spreading: as shown in FIG. 1. FIG. 1 is a schematic diagram of a process of obtaining a spread sequence after XORing a low frequency digital signal and a PN sequence in the prior art. Assuming that the low frequency digital signal (information) is 110, a spread sequence is obtained by being XORed with the PN sequence, and then the spread sequence is transmitted; In FIG. 1, the code outputting rate of the PN sequence is six times faster than that of the low frequency digital signal.

Despreading: as shown in FIG. 2. FIG. 2 is a schematic diagram of a process of obtaining a low frequency original signal after a signal receiver receives a spread signal to be XORed with a given PN sequence in the prior art. When the receiving party receives the spread signal to be XORed with the PN sequence to obtain the low frequency original signal (information) 110; when receiving the signals from others, it is still a high frequency signal after being XORed with the given PN sequence. As shown in FIG. 3. FIG. 3 is a schematic diagram of a process that after being XORed with the given PN sequence, it is still a high frequency signal when a signal receiver receives a signal from others in the prior art. Even if there is only one bit different (marked in red, i.e., the first bit), it is still a high frequency signal after being XORed with the PN sequence. Namely, any desired signal will be despreaded to be a low frequency signal, and any unwanted signal is despreaded to be a high frequency signal, which eventually is discarded.

In the communication process, one base station may communicate with multiple mobile terminals at the same time, and the base station uses different PN sequences to communicate with different mobile terminals. However, in fact, each mobile terminal uses the same PN sequence (it just constantly repeats itself), and each mobile terminal uses one PN sequence but starts with different start bits, accurately speaking, it starts with the bits of different serial numbers in the PN sequence. For instance, the PN sequence is 101100110101110011, which is cyclically outputted from the first bit to be a PN sequence that communicates with the base station and the first mobile terminal, and is cyclically outputted from the second bit to be a PN sequence that communicates with the base station and the second mobile terminal, and is cyclically outputted from the third bit to be a PN sequence that communicates with the base station and the third mobile terminal. Therefore, in spread spectrum communication, there is only one long, continuously cycling PN sequence, which is used by all base stations and mobile terminals, and the only difference is that the start bits are in different positions in the PN sequence, and each time a communication is established, the base station allocates a start bit for the mobile terminal and then informs the mobile terminal.

The prior art has the following drawbacks: when the communication is established, the PN sequence is determined, and the lawbreakers can test the received signal by using different start bits for the received signal. The start bit of the PN sequence used in the communication spread spectrum can be obtained to monitor the communication as long as the communication time is long enough.

Therefore, the prior art has yet to be improved and developed.

SUMMARY OF THE INVENTION

In the communication process between the base station and the mobile terminal in the present invention, the first spread sequence or second spread sequence randomly selected for each time of transmitting a signal, and since the PN sequence used for each time of the communication process is changed, the present invention effectively prevents lawbreakers from decoding and monitoring a communication process and to improve confidentiality of the communication process in comparison with the prior art in which the PN sequence is unchanged.

First, the embodiment of the present invention provides a mobile terminal, comprising: a memory configured to store instructions; a processor configured to execute the instructions, which cause the processor to perform steps comprising:

pre-configuring a first standard PN sequence and a second standard PN sequence, and when communication between the mobile terminal and a base station is established, receiving a first start bit serial number of the first standard PN sequence and a second start bit serial number of the second standard PN sequence from the base station;

based on the first start bit serial number of the first standard PN sequence, obtaining a first cyclic PN sequence, and based on the second start bit serial number of the second standard PN sequence, obtaining a second cyclic PN sequence;

when transmitting information to the base station, randomly XORing corresponding digits of a low frequency digital sequence of information to be transmitted and the first cyclic PN sequence and the second cyclic PN sequence, to obtain a spread sequence, and transmitting the spread sequence out; and when receiving information from the base station, receiving a spread sequence transmitted by the base station, and XORing the spread sequence transmitted by the base station with the first cyclic PN sequence and the second cyclic PN sequence, to obtain a first sequence to be determined and a second sequence to be determined; and for each of the first sequence to be determined and the second sequence to be determined, determining whether the first sequence to be determined or the second sequence to be determined is a high frequency digital sequence, and if so, discarding the first sequence to be determined or the second sequence to be determined, and if not, determining that the first sequence to be determined or the second sequence to be determined is the information from the base station.

In the mobile terminal, the step of pre-configuring the first standard PN sequence and the second standard PN sequence, and when the communication between the mobile terminal and the base station is established, receiving the first start bit serial number of the first standard PN sequence and the second start bit serial number of the second standard PN sequence from the base station comprises:

pre-configuring the first standard PN sequence and the second standard PN sequence, and pre-storing the first standard PN sequence and the second standard PN sequence for transmitting the information signal in the mobile terminal; and when the communication between the mobile terminal and the base station is established, receiving the first start bit serial number of the first standard PN sequence and the second start bit serial number of the second standard PN sequence from the base station.

In the method for the mobile terminal to securely receive the signal based on spreading the spectrum and despreading the spectrum, the step of, based on the first start bit serial number of the first standard PN sequence, obtaining the first cyclic PN sequence, and based on the second start bit serial number of the second standard PN sequence, obtaining the second cyclic PN sequence comprises:

deleting each digit of the first standard PN sequence on the left of the first start bit serial number, to obtain a sequence of digits each of which is selected from a group consisting of 0 and 1, and appending an infinite number of the first standard PN sequence to the sequence of digits, to obtain the first cyclic PN sequence; and deleting each digit of the second standard PN sequence on the left of the second start bit serial number, to obtain a sequence of digits each of which is selected from a group consisting of 0 and 1, and appending an infinite number of the second standard PN sequence to the sequence of digits, to obtain the second cyclic PN sequence.

In the mobile terminal, the step of randomly XORing corresponding digits of the low frequency digital sequence of information to be transmitted and the first cyclic PN sequence and the second cyclic PN sequence, to obtain the spread sequence, and transmitting the spread sequence out comprises:

XORing corresponding digits of the low frequency digital sequence of the information to be transmitted and the first cyclic PN sequence and the second cyclic PN sequence, to obtain two spread sequences, wherein the low frequency digital sequence of the information to be transmitted comprises actual communication content and is a sequence of digits each of which is selected from a group consisting of 0 and 1; and randomly selecting one of the spread sequences, modulating a selected one of the spread sequences, and transmitting a selected and modulated one of the spread sequences out.

In the mobile terminal, the step of receiving the spread sequence transmitted by the base station, and XORing the spread sequence transmitted by the base station with the first cyclic PN sequence and the second cyclic PN sequence, to obtain the first sequence to be determined and the second sequence to be determined comprises:

receiving a modulated spread sequence transmitted by the base station, demodulating the modulated spread sequence; and XORing a demodulated spread sequence with the first cyclic PN sequence and the second cyclic PN sequence, to obtain the first sequence to be determined and the second sequence to be determined.

Second, the embodiment of the present invention provides a base station, comprising: a memory configured to store instructions; a processor configured to execute the instructions, which cause the processor to perform steps comprising:

pre-configuring a first standard PN sequence and a second standard PN sequence, and when communication between the base station and a mobile station is established, allocating and transmitting a first start bit serial number of the first standard PN sequence and a second start bit serial number of the second standard PN sequence to the mobile terminal;

based on the first start bit serial number of the first standard PN sequence, obtaining a first cyclic PN sequence, and based on the second start bit serial number of the second standard PN sequence, obtaining a second cyclic PN sequence;

when transmitting information to the mobile terminal, randomly XORing corresponding digits of a low frequency digital sequence of information to be transmitted and the first cyclic PN sequence and the second cyclic PN sequence, to obtain a spread sequence, and transmitting the spread sequence out; and when receiving information from the mobile terminal, receiving a spread sequence transmitted by the mobile terminal, and XORing the spread sequence transmitted by the base station with the first cyclic PN sequence and the second cyclic PN sequence, to obtain a first sequence to be determined and a second sequence to be determined; and for each of the first sequence to be determined and the second sequence to be determined, determining whether the first sequence to be determined or the second sequence to be determined is a high frequency digital sequence, and if so, discarding the first sequence to be determined or the second sequence to be determined, and if not, determining that the first sequence to be determined or the second sequence to be determined is the information from the mobile terminal.

In the base station, the step of pre-configuring the first standard PN sequence and the second standard PN sequence, and when communication between the base station and the mobile station is established, allocating and transmitting the first start bit serial number of the first standard PN sequence and the second start bit serial number of the second standard PN sequence to the mobile terminal comprises:

pre-configuring the first standard PN sequence and the second standard PN sequence, and pre-storing the first standard PN sequence and the second standard PN sequence for transmitting the information signal in the base station;

numbering the first standard PN sequence and the second standard PN sequence from left to right in accordance with a 1 to N manner, wherein each of the first standard PN sequence and the second standard PN sequence is a finite sequence of digits each of which is selected from a group consisting of 0 and 1, and a serial number represents a sequence number of a digit in the first standard PN sequence or the second standard PN sequence; and when the communication between the base station and the mobile station is established, allocating and transmitting the first start bit serial number of the first standard PN sequence and the second start bit serial number of the second standard PN sequence to the mobile terminal.

In the base station, the step of, based on the first start bit serial number of the first standard PN sequence, obtaining the first cyclic PN sequence, and based on the second start bit serial number of the second standard PN sequence, obtaining the second cyclic PN sequence comprises:

deleting each digit of the first standard PN sequence on the left of the first start bit serial number, to obtain a sequence of digits each of which is selected from a group consisting of 0 and 1, and appending an infinite number of the first standard PN sequence to the sequence of digits, to obtain the first cyclic PN sequence; and deleting each digit of the second standard PN sequence on the left of the second start bit serial number, to obtain a sequence of digits each of which is selected from a group consisting of 0 and 1, and appending an infinite number of the second standard PN sequence to the sequence of digits, to obtain the second cyclic PN sequence.

In the base station, the step of randomly XORing corresponding digits of the low frequency digital sequence of information to be transmitted and the first cyclic PN sequence and the second cyclic PN sequence, to obtain the spread sequence, and transmitting the spread sequence out comprises:

XORing corresponding digits of the low frequency digital sequence of the information to be transmitted and the first cyclic PN sequence and the second cyclic PN sequence, to obtain two spread sequences, wherein the low frequency digital sequence of the information to be transmitted comprises actual communication content and is a sequence of digits each of which is selected from a group consisting of 0 and 1; and randomly selecting one of the spread sequences, modulating a selected one of the spread sequences, and transmitting a selected and modulated one of the spread sequences out.

In the base station, the step of XORing the spread sequence transmitted by the base station with the first cyclic PN sequence and the second cyclic PN sequence, to obtain the first sequence to be determined and the second sequence to be determined comprises:

receiving a modulated spread sequence transmitted by the mobile terminal, demodulating the modulated spread sequence; and XORing a demodulated spread sequence with the first cyclic PN sequence and the second cyclic PN sequence, to obtain the first sequence to be determined and the second sequence to be determined.

Third, the embodiment of the present invention provides a non-transitory computer-readable medium with instructions stored thereon, that when executed by a processor in a mobile terminal, cause the processor to perform steps comprising:

pre-configuring a first standard PN sequence and a second standard PN sequence, and when communication between the mobile terminal and a base station is established, receiving a first start bit serial number of the first standard PN sequence and a second start bit serial number of the second standard PN sequence from the base station;

based on the first start bit serial number of the first standard PN sequence, obtaining a first cyclic PN sequence, and based on the second start bit serial number of the second standard PN sequence, obtaining a second cyclic PN sequence;

when transmitting information to the base station, randomly XORing corresponding digits of a low frequency digital sequence of information to be transmitted and the first cyclic PN sequence and the second cyclic PN sequence, to obtain a spread sequence, and transmitting the spread sequence out: and when receiving information from the base station, receiving a spread sequence transmitted by the base station, and XORing the spread sequence transmitted by the base station with the first cyclic PN sequence and the second cyclic PN sequence, to obtain a first sequence to be determined and a second sequence to be determined; and for each of the first sequence to be determined and the second sequence to be determined, determining whether the first sequence to be determined or the second sequence to be determined is a high frequency digital sequence, and if so, discarding the first sequence to be determined or the second sequence to be determined, and if not, determining that the first sequence to be determined or the second sequence to be determined is the information from the base station.

In the non-transitory computer-readable medium with instructions stored thereon, the step of pre-configuring the first standard PN sequence and the second standard PN sequence, and when the communication between the mobile terminal and the base station is established, receiving the first start bit serial number of the first standard PN sequence and the second start bit serial number of the second standard PN sequence from the base station comprises:

pre-configuring the first standard PN sequence and the second standard PN sequence, and pre-storing the first standard PN sequence and the second standard PN sequence for transmitting the information signal in the mobile terminal; and when the communication between the mobile terminal and the base station is established, receiving the first start bit serial number of the first standard PN sequence and the second start bit serial number of the second standard PN sequence from the base station.

In the non-transitory computer-readable medium with instructions stored thereon, the step of, based on the first start bit serial number of the first standard PN sequence, obtaining the first cyclic PN sequence, and based on the second start bit serial number of the second standard PN sequence, obtaining the second cyclic PN sequence comprises:

deleting each digit of the first standard PN sequence on the left of the first start bit serial number, to obtain a sequence of digits each of which is selected from a group consisting of 0 and 1, and appending an infinite number of the first standard PN sequence to the sequence of digits, to obtain the first cyclic PN sequence; and deleting each digit of the second standard PN sequence on the left of the second start bit serial number, to obtain a sequence of digits each of which is selected from a group consisting of 0 and 1, and appending an infinite number of the second standard PN sequence to the sequence of digits, to obtain the first cyclic PN sequence.

In the non-transitory computer-readable medium with instructions stored thereon, the step of randomly XORing corresponding digits of the low frequency digital sequence of information to be transmitted and the first cyclic PN sequence and the second cyclic PN sequence, to obtain the spread sequence, and transmitting the spread sequence out comprises:

XORing corresponding digits of the low frequency digital sequence of the information to be transmitted and the first cyclic PN sequence and the second cyclic PN sequence, to obtain two spread sequences, wherein the low frequency digital sequence of the information to be transmitted comprises actual communication content and is a sequence of digits each of which is selected from a group consisting of 0 and 1; and randomly selecting one of the spread sequences, modulating a selected one of the spread sequences, and transmitting a selected and modulated one of the spread sequences out.

In the non-transitory computer-readable medium with instructions stored thereon, the step of receiving the spread sequence transmitted by the base station, and XORing the spread sequence transmitted by the base station with the first cyclic PN sequence and the second cyclic PN sequence, to obtain the first sequence to be determined and the second sequence to be determined comprises:

receiving a modulated spread sequence transmitted by the base station, demodulating the modulated spread sequence; and XORing the demodulated spread sequence with the first cyclic PN sequence and the second cyclic PN sequence, to obtain the first sequence to be determined and the second sequence to be determined.

The present invention discloses a method and a system for a mobile terminal to securely receive a signal according to a spread spectrum and a despread spectrum. The first standard PN sequence and the second standard PN sequence for transmitting the information signal are pre-stored in the base station and the mobile terminal. When the communication is established, the base station allocates the start bit serial numbers of the first standard PN sequence and the second standard PN sequence, and transmits the start bit serial numbers to the mobile terminal to determine the first cyclic PN sequence and second cyclic PN sequence for spreading/despreading the spectrum; when the mobile terminal or the base station transmits the information, the low frequency digital sequence of information to be transmitted is randomly XORed with the first cyclic PN sequence or the second cyclic PN sequence, to obtain the spread sequence and to transmit the modulated spread sequence out; the base station or the mobile terminal receives the spread sequence transmitted by the other party, and the first and second cyclic PN sequences are respectively used for despreading. In the communication process between the base station and the mobile terminal in the present invention, the first spread sequence or second spread sequence randomly selected for each time of transmitting a signal, and since the PN sequence used for each time of the communication process is changed, the present invention effectively prevents lawbreakers from decoding and monitoring a communication process and to improve confidentiality of the communication process in comparison with the prior art in which the PN sequence is unchanged.

BRIEF DESCRIPTION OF THE SEVERAL VIEWS OF THE DRAWINGS

FIG. 1 is a schematic diagram of a process of obtaining a spread sequence after XORing a low frequency digital signal and a PN sequence in the prior art.

FIG. 2 is a schematic diagram of a process of obtaining a low frequency original signal after a signal receiver receives a spread signal to be XORed with a given PN sequence in the prior art.

FIG. 3 is a schematic diagram of a process that after being XORed with the given PN sequence, it is still a high frequency signal when a signal receiver receives a signal from others in the prior art.

DESCRIPTION OF SPECIFIC EMBODIMENTS OF THE INVENTION

For the purpose, technical solutions and advantages of the present invention will become clear, unambiguous, embodiments of the present invention is described in further detail below with reference to the accompanying drawings simultaneously. It should be noted that the specific embodiments described herein are merely for explaining the present invention and are not intended to limit the present invention.

Figure 4:
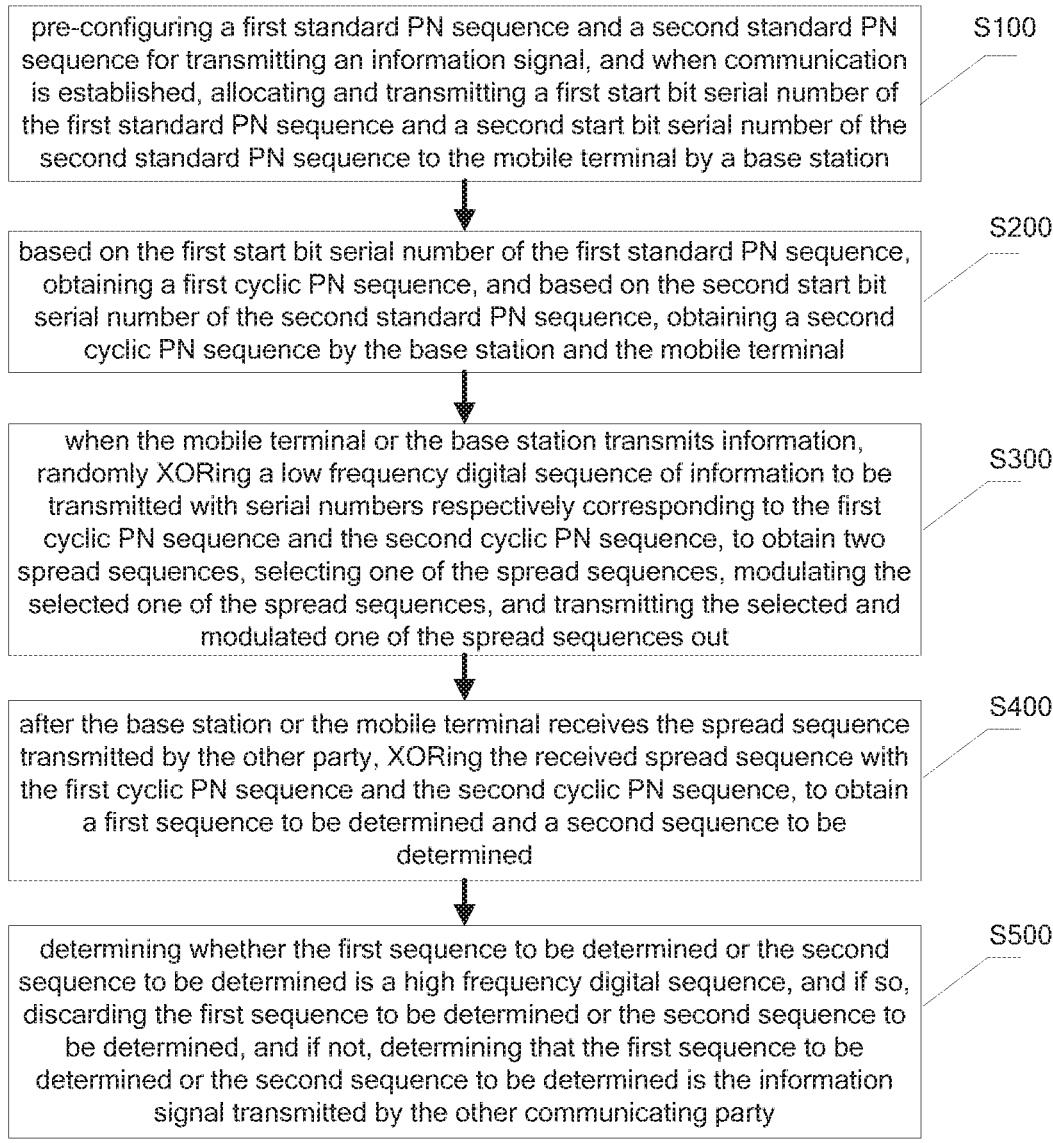
FIG. 4 is a flow chart of a preferred embodiment of a method for a mobile terminal to securely receive a signal based on spreading the spectrum and despreading the spectrum according to the present invention.

Please refer to FIG. 4. FIG. 4 is a flow chart of a preferred embodiment of a method for a mobile terminal to securely receive a signal based on spreading the spectrum and despreading the spectrum according to the present invention.

As shown in FIG. 4, the embodiment of the present invention provides a method for a mobile terminal to securely receive a signal based on spreading the spectrum and despreading the spectrum, comprising steps of:

Step S100, pre-configuring a first standard PN sequence and a second standard PN sequence, and when communication between the mobile terminal and a base station is established, receiving a first start bit serial number of the first standard PN sequence and a second start bit serial number of the second standard PN sequence from the base station.

In the present invention, after pre-configure the first standard PN sequence and the second standard PN sequence, the first standard PN sequence and the second standard PN sequence for transmitting the information signal are pre-stored in the base station and the mobile terminal; each of the first standard PN sequence and the second standard PN sequence is a finite sequence of digits each of which is selected from a group consisting of 0 and 1, and the first standard PN sequence and the second standard PN sequence are different, and the first standard PN sequence and the second standard PN sequence are numbered from left to right in accordance with a 1 to N manner, and an illustration of a standard PN sequence is shown below:

01011111101000000010111111111111111111111000 0010101010101010 110

Each number of the first standard PN sequence or the second standard PN sequence is sequentially numbered from left to right. The numbering method that is more commonly used and suitable for use is numbered from 1 to 2, 3, . . . , N from small to large, for instance, the number of the first zero on the left side of the standard PN sequence in the previous illustration is 1, and the first one on the left side is numbered 2, and the second zero on the left side is numbered 3; the number indicates a serial number of the number in the first standard PN sequence or the second standard PN sequence, and the first start bit serial number or the second start bit serial number is used by the base station to allocate for the mobile terminal when the communication is established.

when the base station and the mobile terminal establish the communication, allocating and transmitting the first start bit serial number of the first standard PN sequence and the second start bit serial number of the second standard PN sequence to the mobile terminal by the base station.

Step S200, based on the first start bit serial number of the first standard PN sequence, obtaining a first cyclic PN sequence, and based on the second start bit serial number of the second standard PN sequence, obtaining a second cyclic PN sequence.

In the present invention, each digit of the first standard PN sequence on the left of the first start bit number is deleted, to obtain a sequence of digits each of which is selected from a group consisting of 0 and 1, and an infinite number of the first standard PN sequence is appended to the sequence of digits, to obtain the first cyclic PN sequence; each digit of the second standard PN sequence on the left of the second start bit serial number is deleted, to obtain a sequence of digits each of which is selected from a group consisting of 0 and 1, and an infinite number of the second standard PN sequence is appended to the sequence of digits, to obtain the second cyclic PN sequence.

The first cyclic PN sequence and the second cyclic PN sequence are each an infinite sequence of digits each of which is selected from a group consisting of 0 and 1; taking the first cyclic PN sequence obtained by the base station and the mobile terminal from the pre-stored first standard PN sequence according to the first start bit number as an illustration, the first cyclic PN sequence is obtained as follows: each digit of the first standard PN sequence on the left of the first start bit number is deleted, to obtain a sequence of digits each of which is selected from a group consisting of 0 and 1, and an infinite number of the first standard PN sequence is appended to the sequence of digits, then the first cyclic PN sequence is obtained; for instance, the first standard PN sequence is 01011111101000000 and the first start bit number is 3, and the first cyclic PN sequence is 01111111010000000 01011111101000000 01011111101000000 01011111101000000 . . . ; the second cyclic sequence is obtained in the same manner as the first cyclic sequence and is not repeated herein.

Step S300, when transmitting information to the base station, randomly XORing corresponding digits of a low frequency digital sequence of information to be transmitted and the first cyclic PN sequence and the second cyclic PN sequence, to obtain a spread sequence, and transmitting the spread sequence out.

In the present invention, the low frequency digital sequence of the information to be transmitted comprises actual communication content and is a sequence of digits each of which is selected from a group consisting of 0 and 1, and the low frequency digital sequence of information to be transmitted is randomly XORed with serial numbers corresponding to the first cyclic PN sequence or the second cyclic PN sequence, to obtain a spread sequence; the specific XORing manner is the same as shown in FIG. 1, and when a digit 1 or 0 in the low frequency digital sequence is same as a corresponding digit 1 or 0 in the first cyclic PN sequence or the second cyclic PN sequence, a digit of 1 is obtained, and if a digit 1 or 0 in the low frequency digital sequence is different from a corresponding digit 1 or 0 in the first cyclic PN sequence or the second cyclic PN sequence, a digit of 0 is obtained, based on which corresponding one-by-one comparison is performed, to obtain a first spread sequence and a second spread sequence.

When a transmitting party obtains the first spread sequence and the second spread sequence, randomly select one of the first spread sequence and second spread sequence, modulate the selected one of the spread sequences, and transmit the selected and modulated one of the spread sequences out; the modulating is a process in which the transmitting party transmits information carried in a carrier wave out through an antenna, wherein the information is in a form of a sequence of digits each of which is selected from a group consisting of 0 and 1.

Briefly, each time the transmitting party transmits a low frequency digital sequence, the low frequency digital sequence needs to be XORed with the first cyclic PN sequence to obtain a first spread sequence; meanwhile, the low frequency digital sequence needs to be XORed with the second cyclic PN sequence to obtain a second spread sequence; and then, one of the two spread sequences is randomly selected to transmit the selected and modulated one of the spread sequences out; with such manner, the PN sequence used each time for spreading is changed, to effectively prevents lawbreakers from decoding and monitoring a communication process and to improve confidentiality of the communication process.

Step S400, when receiving information from the base station, receiving a spread sequence transmitted by the base station, and XORing the spread sequence transmitted by the base station with the first cyclic PN sequence and the second cyclic PN sequence, to obtain a first sequence to be determined and a second sequence to be determined.

In the present invention, after the base station or the mobile terminal receives the spread sequence transmitted by the other party, it demodulates the spread sequence, and then XORs the demodulated spread sequence with the first cyclic PN sequence and the second cyclic PN sequence; the demodulating is a process in which after a receiving party receives the information signal, the receiving party removes a carrier wave, to obtain information transmitted by a transmitting party; the demodulated spread sequence is XORed with the first cyclic PN sequence and the second cyclic PN sequence, to obtain the first sequence to be determined and the second sequence to be determined.

The first sequence to be determined and the second sequence to be determined are final signal results obtained by the receiving party, but the result still needs to be determined whether it is a high frequency signal or a low frequency signal.

Step S500, for each of the first sequence to be determined and the second sequence to be determined, determining whether the first sequence to be determined or the second sequence to be determined is a high frequency digital_sequence, and if so, discarding the first sequence to be determined or the second sequence to be determined, and if not, determining that the first sequence to be determined or the second sequence to be determined is the information from the base station.

In the present invention, after obtaining the first sequence to be determined and the second sequence to be determined, it need s to be determined whether the first sequence to be determined or the second sequence to be determined is a high frequency digital sequence, and if it is a high frequency digital sequence, the first sequence to be determined or the second sequence to be determined is discarded, and if it is a low frequency digital sequence, that the first sequence to be determined or the second sequence to be determined is determined to be the information signal transmitted by the other communicating party. For the high frequency sequence and low frequency sequence, the frequency of 0 or 1 of the two is very different, or the two can be determined by the time difference between low to high or high to low (the high frequency signal changes very fast and possesses a sudden change with respect to the low frequency signal). If the time difference is small, it is a high frequency sequence, and if the time difference is large, it is a low frequency sequence.

Figure 5:
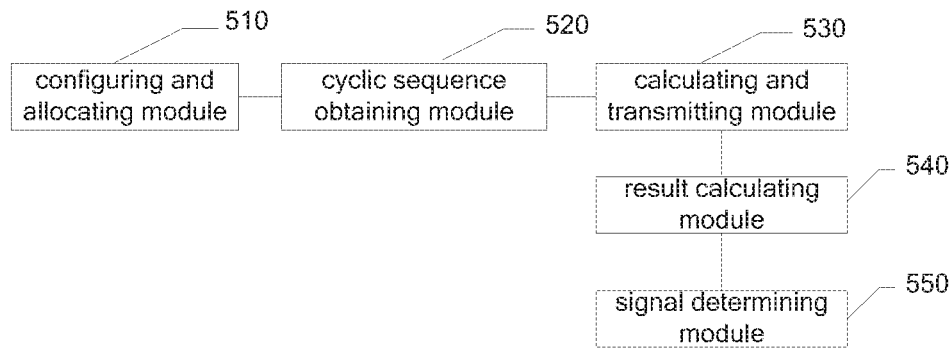
FIG. 5 is a functional block diagram of a preferred embodiment of a system for a mobile terminal to securely receive a signal based on spreading the spectrum and despreading the spectrum according to the present invention.

Based on the foregoing embodiment, the present invention further provides a system for a mobile terminal to securely receive a signal based on spreading a spectrum and despreading the spectrum. Please refer to FIG. 5. FIG. 5 is a functional block diagram of a preferred embodiment of a system for a mobile terminal to securely receive a signal based on spreading the spectrum and despreading the spectrum according to the present invention.

As shown in FIG. 5, the system comprises:

a configuring and allocating module 510 configured to pre-configure a first standard PN sequence and a second standard PN sequence for transmitting an information signal, and, when communication is established, allocate and transmit a first start bit serial number of the first standard PN sequence and a second start bit serial number of the second standard PN sequence to the mobile terminal by a base station, specifically as described above.

a cyclic sequence obtaining module 520 configured to, based on the first start bit serial number of the first standard PN sequence, obtain a first cyclic PN sequence, and, based on the second start bit serial number of the second standard PN sequence, obtain a second cyclic PN sequence by the base station and the mobile terminal, specifically as described above.

a calculating and transmitting module 530 configured to, when the mobile terminal or the base station transmits information, randomly XOR a low frequency digital sequence of information to be transmitted with serial numbers respectively corresponding to the first cyclic PN sequence and the second cyclic PN sequence, to obtain two spread sequences, select one of the spread sequences, modulate the selected one of the spread sequences, and transmit the selected and modulated one of the spread sequences out, specifically as described above.

a result calculating module 540 configured to, after the base station or the mobile terminal receives the spread sequence transmitted by the other party, XOR the received spread sequence with the first cyclic PN sequence and the second cyclic PN sequence, to obtain a first sequence to be determined and a second sequence to be determined, specifically as described above.

a signal determining module 550 configured to determine whether the first sequence to be determined or the second sequence to be determined is a high frequency digital sequence, and if so, discard the first sequence to be determined or the second sequence to be determined, and if not, determine that the first sequence to be determined or the second sequence to be determined is the information signal transmitted by the other communicating party; specifically as described above.

Furthermore, in the system for the mobile terminal to securely receive the signal based on spreading the spectrum and despreading the spectrum, the configuring and allocating module specifically comprises:

a configuring and storing unit configured to, after pre-configure the first standard PN sequence and the second standard PN sequence, pre-store the first standard PN sequence and the second standard PN sequence for transmitting the information signal in the base station and the mobile terminal; specifically as described above.

a sequence numbering unit configured to number the first standard PN sequence and the second standard PN sequence from left to right in accordance with a 1 to N manner, wherein each of the first standard PN sequence and the second standard PN sequence is a finite sequence of digits each of which is selected from a group consisting of 0 and 1, and the serial number represents a sequence number of a digit in the first standard PN sequence or the second standard PN sequence; specifically as described above.

a communication establishing unit configured to, when the base station and the mobile terminal establish the communication, allocate and transmit the first start bit serial number of the first standard PN sequence and the second start bit serial number of the second standard PN sequence to the mobile terminal by the base station; specifically as described above.

In the system for the mobile terminal to securely receive the signal based on spreading the spectrum and despreading the spectrum, the cyclic sequence obtaining module specifically comprises:

a first obtaining unit configured to delete each digit of the first standard PN sequence on the left of the first start bit serial number, to obtain a sequence of digits each of which is selected from a group consisting of 0 and 1, and append an infinite number of the first standard PN sequence to the sequence of digits, to obtain the first cyclic PN sequence; specifically as described above.

a second obtaining unit configured to delete each digit of the second standard PN sequence on the left of the second start bit serial number, to obtain a sequence of digits each of which is selected from a group consisting of 0 and 1, and append an infinite number of the second standard PN sequence to the sequence of digits, to obtain the second cyclic PN sequence; specifically as described above.

In the system for the mobile terminal to securely receive the signal based on spreading the spectrum and despreading the spectrum, the calculating and transmitting module specifically comprises:

a first calculating unit configured to randomly XOR the low frequency digital sequence of the information to be transmitted with serial numbers respectively corresponding to the first cyclic PN sequence and the second cyclic PN sequence, to obtain the spread sequences, wherein the low frequency digital sequence of the information to be transmitted comprises actual communication content and is a sequence of digits each of which is selected from a group consisting of 0 and 1; specifically as described above.

a modulating and transmitting unit configured to, when a transmitting party obtains the first spread sequence and the second spread sequence, randomly select one of the first spread sequence and second spread sequence, modulate the selected one of the spread sequences, and transmit the selected and modulated one of the spread sequences out; specifically as described above.

a constituent modulating unit configured to modulate, wherein the step of modulating is a process in which the transmitting party transmits information carried in a carrier wave out through an antenna, wherein the information is in a form of a sequence of digits each of which is selected from a group consisting of 0 and 1; specifically as described above.

In the system for the mobile terminal to securely receive the signal based on spreading the spectrum and despreading the spectrum, the result calculating module specifically comprises:

a demodulating and receiving unit configured to, after the base station or the mobile terminal receives the spread sequence transmitted by the other party, demodulate the spread sequence, and then XOR the demodulated spread sequence with the first cyclic PN sequence and the second cyclic PN sequence; specifically as described above.

a constituent demodulating unit configured to demodulate, wherein the step of demodulating is a process in which after a receiving party receives the information signal, the receiving party removes a carrier wave, to obtain information transmitted by a transmitting party; specifically as described above.

a second calculating unit configured to XOR the demodulated spread sequence with the first cyclic PN sequence and the second cyclic PN sequence, to obtain the first sequence to be determined and the second sequence to be determined; specifically as described above.

In conclusion, the present invention discloses a method and a system for a mobile terminal to securely receive a signal according to a spread spectrum and a despread spectrum. The first standard PN sequence and the second standard PN sequence for transmitting the information signal are pre-stored in the base station and the mobile terminal. When the communication is established, the base station allocates the start bit serial numbers of the first standard PN sequence and the second standard PN sequence, and transmits the start bit serial numbers to the mobile terminal to determine the first cyclic PN sequence and second cyclic PN sequence for spreading/despreading the spectrum; when the mobile terminal or the base station transmits the information, the low frequency digital sequence of information to be transmitted is randomly XORed with the first cyclic PN sequence or the second cyclic PN sequence, to obtain the spread sequence and to transmit the modulated spread sequence out; the base station or the mobile terminal receives the spread sequence transmitted by the other party, and the first and second cyclic PN sequences are respectively used for despreading. In the communication process between the base station and the mobile terminal in the present invention, the first spread sequence or second spread sequence randomly selected for each time of transmitting a signal, and since the PN sequence used for each time of the communication process is changed, the present invention effectively prevents lawbreakers from decoding and monitoring a communication process and to improve confidentiality of the communication process in comparison with the prior art in which the PN sequence is unchanged.

The embodiment of the present invention provides a storage medium with computer programs stored thereon, wherein the computer programs cause computers to execute any of aforesaid methods for a mobile terminal to securely receive a signal based on spreading a spectrum and despreading the spectrum.

Certainly, those skilled in the art can understand that all or part of the processes in the foregoing embodiments can be implemented by a computer program to instruct related hardware (such as a processor, a controller, etc.), and the program may be stored in a computer readable storage medium, and the program may include the flow of the embodiments of the method as aforementioned as being executed. The storage medium may be a memory, a magnetic disk, an optical disk or the like.

Figure 6:
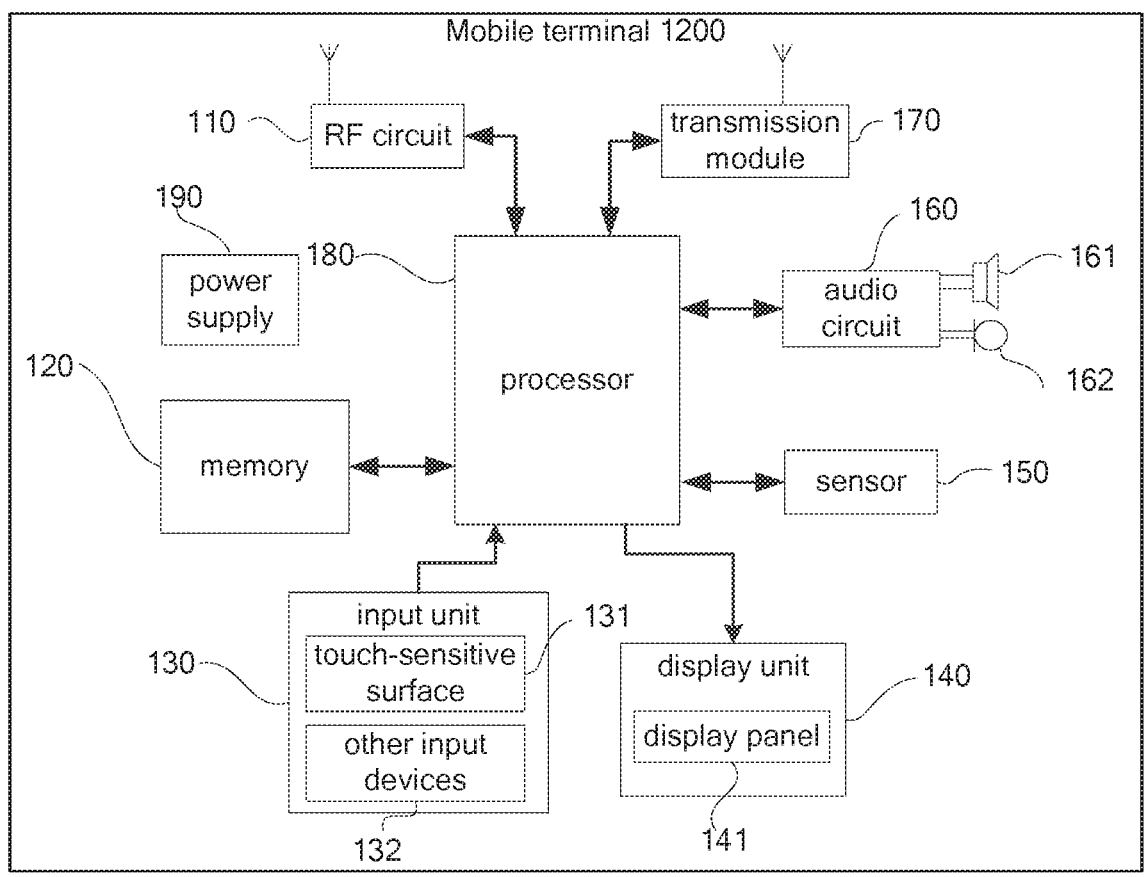
FIG. 6 is a structural diagram of a mobile terminal of an embodiment of the present invention.

FIG. 6 shows a structural diagram of a mobile terminal of an embodiment of the present invention. The mobile terminal can be used for implementing the aforesaid method and system for the mobile terminal to securely receive the signal according to the spread spectrum and the despread spectrum in the foregoing embodiments. The mobile terminal 1200 can be a smart phone or a tablet.

As shown in FIG. 6, the mobile terminal 1200 may include an RF (Radio Frequency) circuit 110, a memory 120 including one or more (only one shown) computer-readable storage medium, an input unit 130, a display unit 140, a sensor 150, an audio circuit 160, a transmission module 170, a processor 180 including one or more processing core (only one shown in the figure) and a power supply 190. It will be understood by those skilled in the art that the structure of the mobile terminal 1200 shown in FIG. 6 does not constitute a limitation of the mobile terminal 1200, and may include more or less components than those illustrated, or a combination of certain components, or different component arrangements. Wherein:

the RF circuit 110 is configured to receive and transmit electromagnetic waves, and to realize mutual conversion between electromagnetic waves and electrical signals, thereby communicating with a communication network or other devices. The RF circuit 110 may include various existing circuit elements for performing these functions, such as an antenna, a radio frequency transceiver, a digital signal processor, an encryption/decryption chip, a Subscriber Identity Module (SIM) card and a memory. The RF circuit 110 can communicate with various networks such as the Internet, an intranet, a wireless network, or communicate with other devices over a wireless network. The wireless network described above may include a cellular telephone network, a wireless local area network or a metropolitan area network. The aforesaid wireless network can use various communication standards, protocols and technologies, including but not limited to Global System for Mobile Communication (GSM), Enhanced Data GSM Environment (EDGE), and wideband code. Wideband Code Division Multiple Access (WCDMA), Code Division Access (CDMA), Time Division Multiple Access (TDMA), Wireless Fidelity (Wi-Fi) (such as the Institute of Electrical and Electronics Engineers Standard IEEE 802.11a, IEEE 802.11b, IEEE 802.11g and/or IEEE 802.11n), Voice over Internet Protocol (VoIP), Worldwide Interoperability for Microwave Access, Wi-Max), other protocols for mail, instant messaging, and short messages, as well as any other suitable communication protocol, may even include protocols that are not currently being developed.

The memory 120 can be used to store software programs and modules, such as program instructions and modules corresponding to the method and the system for the mobile terminal to securely receive the signal according to the spread spectrum and the despread spectrum in the foregoing embodiment. The processor 180 executes each of the software programs and modules stored in the memory 120, thereby performing various functional applications and data processing, that is, achieving the function of the method and the system for the mobile terminal to securely receive the signal according to the spread spectrum and the despread spectrum. The memory 120 can include high speed random access memory, and can also include non-volatile memory, such as one or more magnetic storage devices, flash memory or other non-volatile solid state memory. In some embodiments, memory 120 can further include a memory remotely located relative to processor 180, which can be connected to mobile terminal 1200 via a network. The embodiments of aforesaid networks include, but are not limited to, the Internet, an intranet, a local area network, a mobile communication network and combinations thereof.

The input unit 130 can be configured to receive input numeric or character information and to generate keyboard, mouse, joystick, optical or trackball signal inputs related to user settings and function controls. In particular, the input unit 130 can include a touch-sensitive surface 131 as well as other input devices 132. The touch-sensitive surface 131, also referred to as a touch display or trackpad, can collect touch operations on or near the user (e.g., the user uses a finger, stylus, etc., any suitable object or accessory on the touch-sensitive surface 131 or the operation near the touch-sensitive surface 131) and can drive the corresponding connected device according to a preset program. Optionally, the touch-sensitive surface 131 can include two portions of a touch detection device and a touch controller. The touch detection device detects a touch orientation of the user, and detects a signal caused by the touch operation, and then transmits a signal to the touch controller; the touch controller receives the touch information from the touch detection device, and converts the touch information into contact coordinates, and then sends the same to the processor 180, and can receive commands from the processor 180 and execute the same. In addition, the touch-sensitive surface 131 can be implemented in various types such as resistive, capacitive, infrared and surface acoustic waves. In addition to the touch-sensitive surface 131, the input unit 130 can also include other input devices 132. Specifically, the other input devices 132 may include, but are not limited to, one or more of a physical keyboard, function keys (such as volume control buttons, switch buttons, etc.), trackballs, mice and joysticks.

The display unit 140 can be used to display information entered by the user or the information provided for the user and various graphical user interfaces of mobile terminal 1200, which can be constructed from graphics, text, icons, video and any combination thereof. The display unit 140 may include a display panel 141. Optionally, the display panel 141 may be configured in a form of an LCD (Liquid Crystal Display) or an OLED (Organic Light-Emitting Diode). Furthermore, the touch-sensitive surface 131 may cover the display panel 141. When the touch-sensitive surface 131 detects a touch operation thereon or nearby, the operation is transmitted to the processor 180 to determine the type of the touch event, and then the processor 180 provides a corresponding visual output on the display panel 141 depending on the type of touch event. Although in FIG. 6, touch-sensitive surface 131 and display panel 141 are implemented as two separate components for achieving input function and input function. In some embodiments, the touch-sensitive surface 131 can be integrated with the display panel 141 for achieving input function and input function.

The mobile terminal 1200 can also include at least one type of sensor 150, such as a light sensor, motion sensor and other sensors. Specifically, the light sensor may include an ambient light sensor and a proximity sensor, wherein the ambient light sensor may adjust the brightness of the display panel 141 according to the brightness of the ambient light, and the proximity sensor may power off the display panel 141 and/or the backlight when the mobile terminal 1200 is moved to the ear. As one motion sensor, the gravity acceleration sensor can detect the magnitude of acceleration in various directions (usually three axes). When it is stationary, it can detect the magnitude and direction of gravity. It can be used to identify the gesture of the mobile phone (such as horizontal and vertical screen switching, related game, magnetometer attitude calibration), vibration recognition related functions (such as pedometer and tapping) and etc.; the mobile terminal 1200 can also be configured with gyroscopes, barometers, hygrometers, thermometers, infrared sensors and other sensors, and details are not described here.

The audio circuit 160, the speaker 161 and the microphone 162 can provide an audio interface between the user and the mobile terminal 1200. The audio circuit 160 can transmit the converted electrical signal of the audio data to the speaker 161, and the speaker 161 converts the electrical signal into a sound signal for outputting; on the other hand, the microphone 162 converts the collected sound signal into an electrical signal, which is received by the audio circuit 160 and is converted into audio data, and then the audio data is outputted to the processor 180 for processing, and then, is transmitted to another terminal for illustration through the RF circuit 110. Alternatively, the audio data is outputted to the memory 120 for further processing. The audio circuit 160 may also include an ear plug jack to provide communication of the peripheral earphones with the mobile terminal 1200.

The mobile terminal 1200 can help the user to send and receive emails, browse web pages, access streaming media, etc. through the transmission module 170 (such as a Wi-Fi module), which provides wireless broadband internet access to the user. Although FIG. 6 shows the transmission module 170, it can be understood that it does not belong to the essential configuration of the mobile terminal 1200, and may be omitted as needed within the scope of not changing the essence of the invention.

The processor 180 is a control center of the mobile terminal 1200 that connects various portions of the entire mobile phone with various interfaces and wires. By running or executing software programs and/or modules stored in the memory 120, and invoking the data stored in the memory 120, the various functions of the mobile terminal 1200 is performed and the data is processed to perform overall monitoring of the mobile phone. Optionally, the processor 180 may include one or more processing cores; in some embodiments, the processor 180 can integrate an application processor and a modem processor, wherein the application processor primarily processes an operating system, a user interface, an application, etc., and the modem processor primarily processes the wireless communications. It can be understood that the aforesaid modem processor may not be integrated into the processor 180.

The mobile terminal 1200 also includes a power supply 190 (such as a battery) that supplies powers for the various components. In some embodiments, the power supply can be logically coupled to processor 180 through a power management system to manage charging, discharging and power consumption management through the power management system. The power supply 190 may also include an arbitrary combination of any one or more of a DC or AC power source, a recharging system, a power failure detection circuit, a power converter or inverter and a power status indicator.

Although not shown, the mobile terminal 1200 may further include a camera and a Bluetooth module, and details are not described here. Specifically, in this embodiment, the display unit of the mobile terminal is a touch screen display. The mobile terminal further comprises a memory, and one or more programs, wherein the one or more programs are stored in the memory and configured to be executed by one or more processors, the one or more programs include instructions for executing the following operations:

the receiving base station of the mobile terminal allocating the first start bit number of the first standard PN sequence and the second start bit number of the second standard PN sequence for the mobile terminal; wherein pre-configuring a first standard PN sequence and a second standard PN sequence for transmitting an information signal, and when communication is established, allocating and transmitting a first start bit serial number of the first standard PN sequence and a second start bit serial number of the second standard PN sequence to the mobile terminal by a base station;

based on the first start bit serial number of the first standard PN sequence, obtaining a first cyclic PN sequence, and based on the second start bit serial number of the second standard PN sequence, obtaining a second cyclic PN sequence by the base station and the mobile terminal;

when the mobile terminal or the base station transmits information, randomly XORing a low frequency digital sequence of information to be transmitted with serial numbers respectively corresponding to the first cyclic PN sequence and the second cyclic PN sequence, to obtain two spread sequences, selecting one of the spread sequences, modulating the selected one of the spread sequences, and transmitting the selected and modulated one of the spread sequences out;

after the base station or the mobile terminal receives the spread sequence transmitted by the other party, XORing the received spread sequence with the first cyclic PN sequence and the second cyclic PN sequence, to obtain a first sequence to be determined and a second sequence to be determined; and determining whether the first sequence to be determined or the second sequence to be determined is a high frequency digital sequence, and if so, discarding the first sequence to be determined or the second sequence to be determined, and if not, determining that the first sequence to be determined or the second sequence to be determined is the information signal transmitted by the other communicating party.

While pre-configuring the first standard PN sequence and the second standard PN sequence for transmitting the information signal, and when the communication is established, allocating and transmitting the first start bit serial number of the first standard PN sequence and the second start bit serial number of the second standard PN sequence to the mobile terminal by the base station, the processor is further employed to execute steps of:

after pre-configuring the first standard PN sequence and the second standard PN sequence, pre-storing the first standard PN sequence and the second standard PN sequence for transmitting the information signal in the base station and the mobile terminal;

numbering the first standard PN sequence and the second standard PN sequence from left to right in accordance with a 1 to N manner, wherein each of the first standard PN sequence and the second standard PN sequence is a finite sequence of digits each of which is selected from a group consisting of 0 and 1, and the serial number represents a sequence number of a digit in the first standard PN sequence or the second standard PN sequence; and when the base station and the mobile terminal establish the communication, allocating and transmitting the first start bit serial number of the first standard PN sequence and the second start bit serial number of the second standard PN sequence to the mobile terminal by the base station.

While based on the first start bit serial number of the first standard PN sequence, obtaining the first cyclic PN sequence, and based on the second start bit serial number of the second standard PN sequence, obtaining the second cyclic PN sequence by the base station and the mobile terminal, the processor is further employed to execute steps of:

deleting each digit of the first standard PN sequence on the left of the first start bit serial number, to obtain a sequence of digits each of which is selected from a group consisting of 0 and 1, and appending an infinite number of the first standard PN sequence to the sequence of digits, to obtain the first cyclic PN sequence; and deleting each digit of the second standard PN sequence on the left of the second start bit serial number, to obtain a sequence of digits each of which is selected from a group consisting of 0 and 1, and appending an infinite number of the second standard PN sequence to the sequence of digits, to obtain the second cyclic PN sequence.

When the mobile terminal or the base station transmits information, randomly XORing a low frequency digital sequence of information to be transmitted with serial numbers respectively corresponding to the first cyclic PN sequence and the second cyclic PN sequence, to obtain two spread sequences, selecting one of the spread sequences, modulating the selected one of the spread sequences, and transmitting the selected and modulated one of the spread sequences out, the processor is further employed to execute steps of:

randomly XORing the low frequency digital sequence of the information to be transmitted with the serial numbers respectively corresponding to the first cyclic PN sequence and the second cyclic PN sequence, to obtain the spread sequences, wherein the low frequency digital sequence of the information to be transmitted comprises actual communication content and is a sequence of digits each of which is selected from a group consisting of 0 and 1; and when a transmitting party obtains the first spread sequence and the second spread sequence, randomly selecting one of the first spread sequence and second spread sequence, modulating the selected one of the spread sequences, and transmitting the selected and modulated one of the spread sequences out;

wherein the step of modulating is a process in which the transmitting party transmits information carried in a carrier wave out through an antenna, wherein the information is in a form of a sequence of digits each of which is selected from a group consisting of 0 and 1.

After the base station or the mobile terminal receives the spread sequence transmitted by the other party, XORing the received spread sequence with the first cyclic PN sequence and the second cyclic PN sequence, to obtain the first sequence to be determined and the second sequence to be determined, the processor is further employed to execute steps of:

after the base station or the mobile terminal receives the spread sequence transmitted by the other party, demodulating the spread sequence, and then XORing the demodulated spread sequence with the first cyclic PN sequence and the second cyclic PN sequence;

wherein the step of demodulating is a process in which after a receiving party receives the information signal, the receiving party removes a carrier wave, to obtain information transmitted by a transmitting party; and XORing the demodulated spread sequence with the first cyclic PN sequence and the second cyclic PN sequence, to obtain the first sequence to be determined and the second sequence to be determined.

It should be understood that the application of the present invention is not limited to the foregoing illustrations, and those skilled in the art can make modifications or changes in accordance with the foregoing description, all of which are within the scope of the appended claims.

What is claimed is:

1. A mobile terminal, comprising:
   a memory configured to store instructions;
   a processor configured to execute the instructions, which cause the processor to perform steps comprising:
   pre-configuring a first standard PN sequence and a second standard PN sequence, and when communication between the mobile terminal and a base station is established, receiving a first start bit serial number of the first standard PN sequence and a second start bit serial number of the second standard PN sequence to the mobile terminal by a from the base station;
   based on the first start bit serial number of the first standard PN sequence, obtaining a first cyclic PN sequence, and based on the second start bit serial number of the second standard PN sequence, obtaining a second cyclic PN sequence;
   when transmitting information to the base station, randomly XORing corresponding digits of a low frequency digital sequence of information to be transmitted and the first cyclic PN sequence and the second cyclic PN sequence, to obtain a spread sequence, and transmitting the spread sequence out; and
   when receiving information from the base station,
   receiving a spread sequence transmitted by the base station, and XORing the spread sequence transmitted by the base station with the first cyclic PN sequence and the second cyclic PN sequence, to obtain a first sequence to be determined and a second sequence to be determined; and
   for each of the first sequence to be determined and the second sequence to be determined, determining whether the first sequence to be determined or the second sequence to be determined is a high frequency digital sequence, and if so, discarding the first sequence to be determined or the second sequence to be determined, and if not, determining that the first sequence to be determined or the second sequence to be determined is the information from the base station.

2. The mobile terminal of claim 1, wherein the step of pre-configuring the first standard PN sequence and the second standard PN sequence, and when the communication between the mobile terminal and the base station is established, receiving the first start bit serial number of the first standard PN sequence and the second start bit serial number of the second standard PN sequence from the base station comprises:
   pre-configuring the first standard PN sequence and the second standard PN sequence, and pre-storing the first standard PN sequence and the second standard PN sequence for transmitting the information signal in the mobile terminal; and
   when the communication between the mobile terminal and the base station is established, receiving the first start bit serial number of the first standard PN sequence and the second start bit serial number of the second standard PN sequence from the base station.

3. The mobile terminal of claim 1, wherein the step of, based on the first start bit serial number of the first standard PN sequence, obtaining the first cyclic PN sequence, and based on the second start bit serial number of the second standard PN sequence, obtaining the second cyclic PN sequence comprises:

deleting each digit of the first standard PN sequence on the left of the first start bit serial number, to obtain a sequence of digits each of which is selected from a group consisting of 0 and 1, and appending an infinite number of the first standard PN sequence to the sequence of digits, to obtain the first cyclic PN sequence; and deleting each digit of the second standard PN sequence on the left of the second start bit serial number, to obtain a sequence of digits each of which is selected from a group consisting of 0 and 1, and appending an infinite number of the second standard PN sequence to the sequence of digits, to obtain the first cyclic PN sequence.

4. The mobile terminal of claim 1, wherein the step of randomly XORing corresponding digits of the low frequency digital sequence of information to be transmitted and the first cyclic PN sequence and the second cyclic PN sequence, to obtain the spread sequence, and transmitting the spread sequence out comprises:

XORing corresponding digits of the low frequency digital sequence of the information to be transmitted and the first cyclic PN sequence and the second cyclic PN sequence, to obtain two spread sequences, wherein the low frequency digital sequence of the information to be transmitted comprises actual communication content and is a sequence of digits each of which is selected from a group consisting of 0 and 1; and randomly selecting one of the spread sequences, modulating a selected one of the spread sequences, and transmitting a selected and modulated one of the spread sequences out.

5. The mobile terminal of claim 1, wherein the step of receiving the spread sequence transmitted by the base station, and XORing the spread sequence transmitted by the base station with the first cyclic PN sequence and the second cyclic PN sequence, to obtain the first sequence to be determined and the second sequence to be determined comprises:

receiving a modulated spread sequence transmitted by the base station, demodulating the modulated spread sequence; and XORing a demodulated spread sequence with the first cyclic PN sequence and the second cyclic PN sequence, to obtain the first sequence to be determined and the second sequence to be determined.

6. A base station, comprising:
a memory configured to store instructions;
a processor configured to execute the instructions, which cause the processor to perform steps comprising:
pre-configuring a first standard PN sequence and a second standard PN sequence, and when communication between the base station and a mobile station is established, allocating and transmitting a first start bit serial number of the first standard PN sequence and a second start bit serial number of the second standard PN sequence to the mobile terminal;
based on the first start bit serial number of the first standard PN sequence, obtaining a first cyclic PN sequence, and based on the second start bit serial number of the second standard PN sequence, obtaining a second cyclic PN sequence;
when transmitting information to the mobile terminal, randomly XORing corresponding digits of a low frequency digital sequence of information to be transmitted and the first cyclic PN sequence and the second cyclic PN sequence, to obtain a spread sequence, and transmitting the spread sequence out; and when receiving information from the mobile terminal, receiving a spread sequence transmitted by the mobile terminal, and XORing the spread sequence transmitted by the base station with the first cyclic PN sequence and the second cyclic PN sequence, to obtain a first sequence to be determined and a second sequence to be determined; and for each of the first sequence to be determined and the second sequence to be determined, determining whether the first sequence to be determined or the second sequence to be determined is a high frequency digital sequence, and if so, discarding the first sequence to be determined or the second sequence to be determined, and if not, determining that the first sequence to be determined or the second sequence to be determined is the information from the mobile terminal.

7. The base station of claim 6, wherein the step of pre-configuring the first standard PN sequence and the second standard PN sequence, and when the communication between the base station and the mobile station is established, allocating and transmitting the first start bit serial number of the first standard PN sequence and the second start bit serial number of the second standard PN sequence to the mobile terminal comprises:

pre-configuring the first standard PN sequence and the second standard PN sequence, and pre-storing the first standard PN sequence and the second standard PN sequence for transmitting the information signal in the base station;

numbering the first standard PN sequence and the second standard PN sequence from left to right in accordance with a 1 to N manner, wherein each of the first standard PN sequence and the second standard PN sequence is a finite sequence of digits each of which is selected from a group consisting of 0 and 1, and a serial number represents a sequence number of a digit in the first standard PN sequence or the second standard PN sequence; and when the communication between the base station and the mobile station is established, allocating and transmitting the first start bit serial number of the first standard PN sequence and the second start bit serial number of the second standard PN sequence to the mobile terminal.

8. The base station of claim 6, wherein the step of, based on the first start bit serial number of the first standard PN sequence, obtaining the first cyclic PN sequence, and based on the second start bit serial number of the second standard PN sequence, obtaining the second cyclic PN sequence comprises:

deleting each digit of the first standard PN sequence on the left of the first start bit serial number, to obtain a sequence of digits each of which is selected from a group consisting of 0 and 1, and appending an infinite number of the first standard PN sequence to the sequence of digits, to obtain the first cyclic PN sequence; and deleting each digit of the second standard PN sequence on the left of the second start bit serial number, to obtain a sequence of digits each of which is selected from a group consisting of 0 and 1, and appending an infinite number of the second standard PN sequence to the sequence of digits, to obtain the first cyclic PN sequence.

9. The base station of claim 6, wherein the step of randomly XORing corresponding digits of the low frequency digital sequence of information to be transmitted and the first cyclic PN sequence and the second cyclic PN sequence, to obtain the spread sequence, and transmitting the spread sequence out comprises:
  XORing corresponding digits of the low frequency digital sequence of the information to be transmitted and the first cyclic PN sequence and the second cyclic PN sequence, to obtain two spread sequences, wherein the low frequency digital sequence of the information to be transmitted comprises actual communication content and is a sequence of digits each of which is selected from a group consisting of 0 and 1; and
  randomly selecting one of the spread sequences, modulating a selected one of the spread sequences, and transmitting a selected and modulated one of the spread sequences out.

10. The base station of claim 6, wherein the step of XORing the the spread sequence transmitted by the base station with the first cyclic PN sequence and the second cyclic PN sequence, to obtain the first sequence to be determined and the second sequence to be determined comprises:
  receiving a modulated spread sequence transmitted by the mobile terminal, demodulating the modulated spread sequence; and
  XORing a demodulated spread sequence with the first cyclic PN sequence and the second cyclic PN sequence, to obtain the first sequence to be determined and the second sequence to be determined.

11. A non-transitory computer-readable medium with instructions stored thereon, that when executed by a processor in a mobile terminal, cause the processor to perform steps comprising:
  pre-configuring a first standard PN sequence and a second standard PN sequence, and when communication between the mobile terminal and a base station is established, receiving a first start bit serial number of the first standard PN sequence and a second start bit serial number of the second standard PN sequence from the base station;
  based on the first start bit serial number of the first standard PN sequence, obtaining a first cyclic PN sequence, and based on the second start bit serial number of the second standard PN sequence, obtaining a second cyclic PN sequence;
  when transmitting information to the base station, randomly XORing corresponding digits of a low frequency digital sequence of information to be transmitted and the first cyclic PN sequence and the second cyclic PN sequence, to obtain a spread sequence, and transmitting the spread sequence out; and
  when receiving information from the base station,
    receiving a spread sequence transmitted by the base station, and XORing the spread sequence transmitted by the base station with the first cyclic PN sequence and the second cyclic PN sequence, to obtain a first sequence to be determined and a second sequence to be determined; and
    for each of the first sequence to be determined and the second sequence to be determined, determining whether the first sequence to be determined or the second sequence to be determined is a high frequency digital sequence, and if so, discarding the first sequence to be determined or the second sequence to be determined, and if not, determining that the first sequence to be determined or the second sequence to be determined is the information from the base station.

12. The non-transitory computer-readable medium of claim 11, wherein the step of pre-configuring the first standard PN sequence and the second standard PN sequence, and when the communication between the mobile terminal and the base station is established, receiving the first start bit serial number of the first standard PN sequence and the second start bit serial number of the second standard PN sequence from the base station comprises:
  pre-configuring the first standard PN sequence and the second standard PN sequence, and pre-storing the first standard PN sequence and the second standard PN sequence for transmitting the information signal in the mobile terminal; and
  when the communication between the mobile terminal and the base station is established, receiving the first start bit serial number of the first standard PN sequence and the second start bit serial number of the second standard PN sequence from the base station.

13. The non-transitory computer-readable medium of claim 11, wherein the step of, based on the first start bit serial number of the first standard PN sequence, obtaining the first cyclic PN sequence, and based on the second start bit serial number of the second standard PN sequence, obtaining the second cyclic PN sequence comprises:
  deleting each digit of the first standard PN sequence on the left of the first start bit serial number, to obtain a sequence of digits each of which is selected from a group consisting of 0 and 1, and appending an infinite number of the first standard PN sequence to the sequence of digits, to obtain the first cyclic PN sequence; and
  deleting each digit of the second standard PN sequence on the left of the second start bit serial number, to obtain a sequence of digits each of which is selected from a group consisting of 0 and 1, and appending an infinite number of the second standard PN sequence to the sequence of digits, to obtain the first cyclic PN sequence.

14. The non-transitory computer-readable medium of claim 11, wherein the step of randomly XORing corresponding digits of the low frequency digital sequence of information to be transmitted and the first cyclic PN sequence and the second cyclic PN sequence, to obtain the spread sequence, and transmitting the spread sequence out comprises:
  XORing corresponding digits of the low frequency digital sequence of the information to be transmitted and the first cyclic PN sequence and the second cyclic PN sequence, to obtain two spread sequences, wherein the low frequency digital sequence of the information to be transmitted comprises actual communication content and is a sequence of digits each of which is selected from a group consisting of 0 and 1; and
  randomly selecting one of the spread sequences, modulating a selected one of the spread sequences, and transmitting a selected and modulated one of the spread sequences out.

15. The non-transitory computer-readable medium of claim 11, wherein the step of receiving the spread sequence transmitted by the base station, and XORing the spread sequence transmitted by the base station with the first cyclic PN sequence and the second cyclic PN sequence, to obtain the first sequence to be determined and the second sequence to be determined comprises:

receiving a modulated spread sequence transmitted by the base station, demodulating the modulated spread sequence; and XORing the demodulated spread sequence with the first cyclic PN sequence and the second cyclic PN sequence, to obtain the first sequence to be determined and the second sequence to be determined.

* * * * *